(12) United States Patent
Higuchi et al.

(10) Patent No.: US 6,385,163 B1
(45) Date of Patent: May 7, 2002

(54) OPTICAL RECORDING MEDIUM

(75) Inventors: Takanobu Higuchi; Ayako Yoshida, both of Saitama-ken (JP)

(73) Assignee: Pioneer Electric Corporation, Tokyo (JP)

( * ) Notice: Subject to any disclaimer, the term of this patent is extended or adjusted under 35 U.S.C. 154(b) by 0 days.

(21) Appl. No.: 09/273,570

(22) Filed: Mar. 22, 1999

(30) Foreign Application Priority Data

Mar. 30, 1998 (JP) .......................................... 10-103703

(51) Int. Cl.[7] .............................. G11B 3/70; G11B 5/84; G11B 7/26; B32B 3/02
(52) U.S. Cl. ....................................... 369/288; 428/64.4
(58) Field of Search ................................. 369/288, 272, 369/286; 428/457, 702, 64.4, 64.5, 64.6, 64.7, 64.8, 64.9, 65.1, 65.2, 694, 689, 694 RL

(56) References Cited

U.S. PATENT DOCUMENTS

| | | | | |
|---|---|---|---|---|
| 4,519,065 A | * | 5/1985 | Lewis et al. ............. | 369/275.1 |
| 4,710,452 A | * | 12/1987 | Raychaudhuri ........ | 430/270.13 |
| 5,063,096 A | * | 11/1991 | Kohara et al. ............. | 428/64.4 |
| 5,232,790 A | * | 8/1993 | Arimune et al. ........ | 428/694 TS |
| 5,251,202 A | * | 10/1993 | Kaneko et al. ............. | 369/286 |
| 5,862,121 A | * | 1/1999 | Suzuki .................... | 369/275.1 |
| 5,871,881 A | * | 2/1999 | Nishida et al. ............. | 369/288 |
| 5,942,302 A | * | 8/1999 | Ha et al. ................... | 428/64.1 |
| 5,958,649 A | * | 9/1999 | Hirotsune et al. ..... | 430/270.13 |
| 5,981,014 A | * | 11/1999 | Tsukagoshi et al. ....... | 428/64.1 |
| 6,030,678 A | * | 2/2000 | Aratani ...................... | 428/64.1 |

\* cited by examiner

*Primary Examiner*—Hoa T. Nguyen
*Assistant Examiner*—Julie Anne Watko
(74) *Attorney, Agent, or Firm*—Arent, Fox Kintner Plotkin & Kahn

(57) ABSTRACT

An optical recording medium comprises a first information recording surface; a first reflecting layer formed on the first information recording surface; a second information recording surface; and a second reflecting layer formed on the second information recording surface. In particular, the first reflecting layer contains a titan oxide as a main component.

12 Claims, 12 Drawing Sheets

FIG.11

| ANDLYSIS NUMBER | CONCENTRATION (atom%) | | | COMPOSITION (O/Ti) |
|---|---|---|---|---|
| | O | Ti | Ar | |
| A | 66.0 | 33.5 | 0.5 | 1.97 |
| B | 63.5 | 34.0 | 2.5 | 1.87 |
| C | 67.0 | 32.9 | 0.1 | 2.04 |
| D | 65.0 | 34.0 | 1.0 | 1.91 |
| E | 66.3 | 33.5 | 0.2 | 1.98 |
| F | 66.2 | 33.5 | 0.3 | 1.98 |
| G | 67.6 | 32.2 | 0.2 | 2.10 |
| H | 67.1 | 32.7 | 0.2 | 2.05 |

MEASUREMENT ERROR : O=±5%、Ti=±1%、Ar=±0.3%、O/Ti=±4%

OPTICAL RECORDING MEDIUM

BACKGROUND OF THE INVENTION

The present invention relates to an optical recording medium having a plurality of information recording surfaces each permitting information reproducing by virtue of a laser beam.

There have been in actual use several kinds of optical recording media each of which has a plurality of information recording surfaces. For example, a DVD (digital versatile disc) has two to four information recording surfaces. A user can use a reproducing device to reproduce information from any of these information recording surfaces without having to turn the disc over.

FIG. 12 is an enlarged cross sectional view schematically indicating an example of a conventional optical recording medium having two information recording surfaces (hereinafter referred to as two-disc laminated recording medium), which is adapted to allow a user to use a reproducing device to reproduce information from any of the two information recording surfaces without having to turn the disc over.

As shown in FIG. 12, the conventional two-disc laminated recording medium comprises a first substrate layer 1 formed of a light-transmissible material having a first recording surface 2 formed thereon, a first reflecting layer 3 consisting of gold (Au) or silicon carbide (SiC) formed on the first recording surface 2, a second substrate layer 7 having a second recording surface 6 formed thereon, a second reflecting layer 5 consisting of a metal such as aluminium (Al) formed on the second substrate layer 7. The first substrate layer 1 and the second substrate layer 7 are bonded together with the use of a light-setting resin such as an acrylic ultraviolet-setting resin, in a manner such that the two recording surfaces are faced each other. In fact, such light-setting resin is formed into a spacer layer 4 upon its hardening. Each recording surface includes a plurality of information pits possible to be read by a laser beam having a wave length of 650 nm, and such pits are formed on one surface of each substrate layer.

When reproducing information recorded on the above two-disc laminated recording medium, it is at first necessary to decide which information recording surface is to be reproduced. If it is decided to reproduce, information recorded on the first recording surface 2, a red laser beam having a wave length of 650 nm is converged on to the first recording surface 2, a reflected light from the first reflecting layer 3 is received so that its variation in intensity may be detected, thus reproducing the information recorded on the first recording surface 2.

On the other hand, if it is decided to reproduce information recorded on the second recording surface 6, the same laser beam having a wave length of 650 nm is directed through the first substrate layer 1, the first reflecting layer 3, the spacer layer 4, so as to be converged on to the second recording surface 6. Then, a reflected light from the second reflecting layer 6 is received through the spacer layer 4, the first reflecting layer 3 and the first substrate layer 1, so that its intensity variation may be detected, thereby reproducing the information recorded on the second recording surface 6.

In this manner, it is possible to selectively and continuously reproduce information recorded on the first and second recording surfaces 2 and 6, with the use of a laser beam being directed through the first substrate layer 1. Since it is not necessary to direct a laser beam through the second substrate layer 7, it is not required that the second substrate layer 7 be formed of a light-transmissible material.

However, in order to reproduce the information recorded on the second recording surface 6, it is required that the first reflecting layer 3 be made of a material capable of allowing a laser beam to transmit therethrough to some extent. In practice, the first reflecting layer 3 is a gold film (Au) having a thickness of about 15 nm.

Recently, people have begun to develop a new generation DVD capable of performing an information recording with a further high density using a blue laser beam having a wave length of 400–450 nm, so as to form information pits having smaller sizes which are arranged along a plurality of tracks formed with a smaller pitch. Such kind of DVD should of course be made into a type of a two-disc laminated recording medium in order to store as much information as possible.

However, with a conventional DVD as discussed above, the gold film or the silicon carbide film forming the first reflecting layer 3 has only a low reflectance with respect to a blue laser beam and has only a small light-transmissibility. Accordingly, if the first reflecting layer 3 is formed of gold (Au), it will be difficult to obtain a sufficient amount of reflected light from said first reflecting layer 3, hence making it difficult to reproduce information recorded on the first recording surface 2.

Further, since a light amount passing through the first reflecting layer 2 will become small due to its above-discussed defect, an amount of a reflected light from the second reflecting layer 5 will also be small, thus rendering it difficult to reproduce information recorded on the second recording surface 6.

In order to ensure a sufficient amount of a reflected light for information reproducing, it has been suggested that the first reflecting layer 2 be formed of a material having an adequate reflectance and an adequate light-transmissibility.

To meet the above requirements, Japanese Unexamined Patent Publication No. 9-293270 has disclosed an improved two-disc laminated recording medium whose first reflecting layer is formed into a multi-layer structure including a metal film and a dielectric film.

However, since a reflecting layer has a multi-layer structure, each sub-layer of it has to be controlled strictly, making a whole manufacturing process more difficult than usual. Further, since a metal film forming a reflecting layer is likely to be oxidized and hence corroded, some desired optical properties of a two-disc laminated recording medium will be unavoidably deteriorated.

SUMMARY OF THE INVENTION

It is an object of the present invent ion to provide an improved multi-disc laminated recording medium having at least two or three information recording surfaces, which is easy to manufacture and has an excel lent durability for a long-term use, so as to solve the above-mentioned problems peculiar to the above-mentioned prior arts.

According to the present invention, there is-provided an improved optical recording medium which comprises a first information recording surface; a first reflecting layer formed on the first information recording surface; a second information recording surface; and a second reflecting layer formed on the second information recording surface. In particular, the first reflecting layer contains a titan oxide as a main component.

According to the present invention, there is provided a further improved optical recording medium, comprising: a first information recording surface; a first reflecting layer formed on the first information recording surface; a second information recording surface; a second reflecting layer formed on the second information recording surface; a third information recording surface; and a third reflecting layer formed on the third information recording surface. In particular, each of the first and second reflecting layers contains a titan oxide as a main component.

In one aspect of the present invention, the titan oxide contained in each of the first and second reflecting layers has an O/Ti ratio of 1.8–2.2.

In another aspect of the present invention, each of the first and second reflecting layers is in an amorphous state or consists of an aggregate of fine crystals.

In a further aspect of the present invention, each of the first and second reflecting layers contains a noble gas element with a concentration of 3 atom % or less.

In a still further aspect of the present invention, each of the first and second reflecting layers has a thickness of 150 nm or less.

In one more aspect of the present invention, the third reflecting layer is made of a metal containing an aluminium as a main component.

The above objects and features of the present invention will become better understood from the following description with reference to the accompanying drawings.

BRIEF DESCRIPTION OF DRAWINGS

FIG. 11 is a table indicating the compositions of several reflecting layers which have been used in the present invention.

DETAILED DESCRIPTION OF THE PREFERRED EMBODIMENTS

First Embodiment

Figure 1:
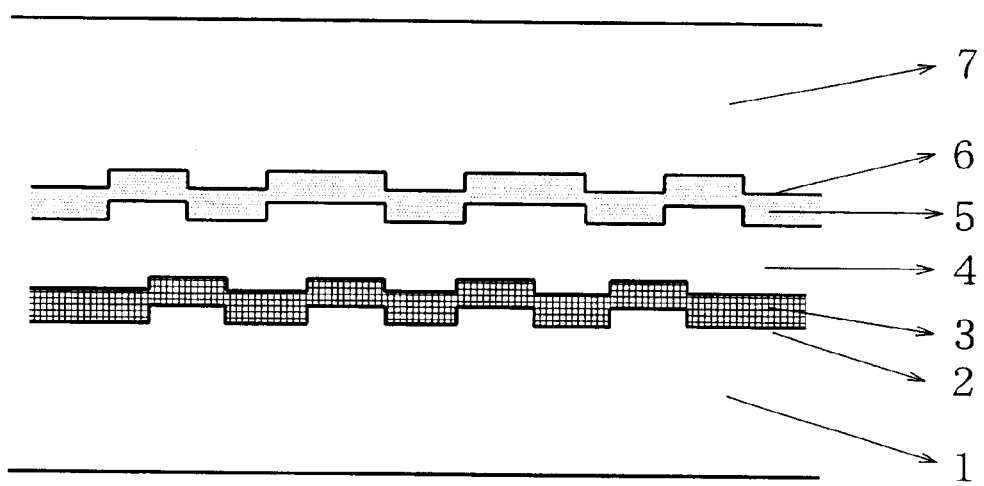
FIG. 1 is an enlarged cross sectional view indicating the structure of a two-disc laminated recording medium made according to a first embodiment of the present invention.

FIG. 1 is an enlarged cross sectional view -showing the structure of a two-disc laminated recording medium made according to a first embodiment of the present invention. As shown in FIG. 1, the two-disc laminated recording medium comprises a first substrate layer 1 formed of a light-transmissible material, a first recording surface 2 formed on the first substrate layer 1, a first reflecting layer 3 formed on the first recording surface 2, a second substrate layer 7, a second recording surface 6 formed on the surface of the second substrate layer 7, a second reflecting layer 5 formed on the second recording surface 6. With the use of a light-setting resin such as an acrylic ultraviolet-setting resin applied between the first reflecting layer 3 and the second reflecting layer 5, the first substrate layer 1 and the second substrate layer 7 are bonded together, in a manner such that the two recording surfaces are facing each other. In fact, such light-setting resin is formed into a spacer layer 4 upon its hardening.

Each of the first and second substrate layers 1 and 7 has on one surface thereof a plurality of information pits possible to be read by a reproducing laser beam, thereby forming the first recording surface 2 and the second recording surface 6. A plurality of spiral-like tracks are formed on each of the first and second recording surfaces 2 and 6 so that the above pits are arranged in and along said tracks.

Each of the first and second substrate layers 1 and 7 is formed of a transparent resin such as polycarbonate resin through an injection molding process, and has a thickness of about 0.6 mm. In detail, these information pits are formed during said inject ion molding process with the use of a metal mould made of nickel (Ni) called a stamper. The spacer layer 4 is formed of a light-setting resin such as an acrylic ultraviolet-setting resin, having a thickness of about 40 microns. The second reflecting layer 5 is made of a metal containing aluminium as a main component, and has a thickness of about 50 nm.

The first reflecting layer 3 is made of a metal oxide such as titan oxide: and has a thickness of about 60 nm.

In order to analyze a reflectance, a light transmissibility, an O/Ti ratio, a noble gas element amount and a crystal state of the first reflecting layer 3, a sample reflecting layer was prepared under an identical condition as if an actual disc is manufactured, using an acryl plate or a glass plate as a substrate plate, or using a well-polished silicon wafer as a substrate plate. In fact, a titan oxide film serving as the first reflecting layer 3 is formed on the substrate layer, but a light-setting resin is not applied since it is not necessary to perform a bonding treatment during such a test.

At first, the optical properties (including a reflectance and a light transmissibility) of the sample reflecting layer is measured by virtue of a method called Spectrochemical Analysis in Ultraviolet and Visible Region using an analysis device (UV-2100, Shimazu Co., Ltd.).

In detail, an absolute reflectance of a standard sample (another sample) is in advance measured using a different method. Then, a reflectance of the above sample reflecting layer is measured and calibrated so as to obtain an absolute reflectance of said sample reflecting layer.

In practice, an incident tight is a parallel light beam which is caused to irradiate the sample reflecting layer from behind the substrate layer with an incident angle of 5 degrees.

On the other hand, when measuring a light transmissibility of the sample reflecting layer, a standard sample (another sample) is not used, while air is used as a comparison medium. An incident light is a parallel light beam which is caused to irradiate the sample reflecting layer from behind the substrate layer with an incident angle of 0 degree.

A s related above, the above sample reflecting layer is formed on an acryl substrate layer, and its thickness is 63 nm which is a value measured by an ellipsometer (AEP-2000, Shimazu Co., Ltd.).

Figure 2:
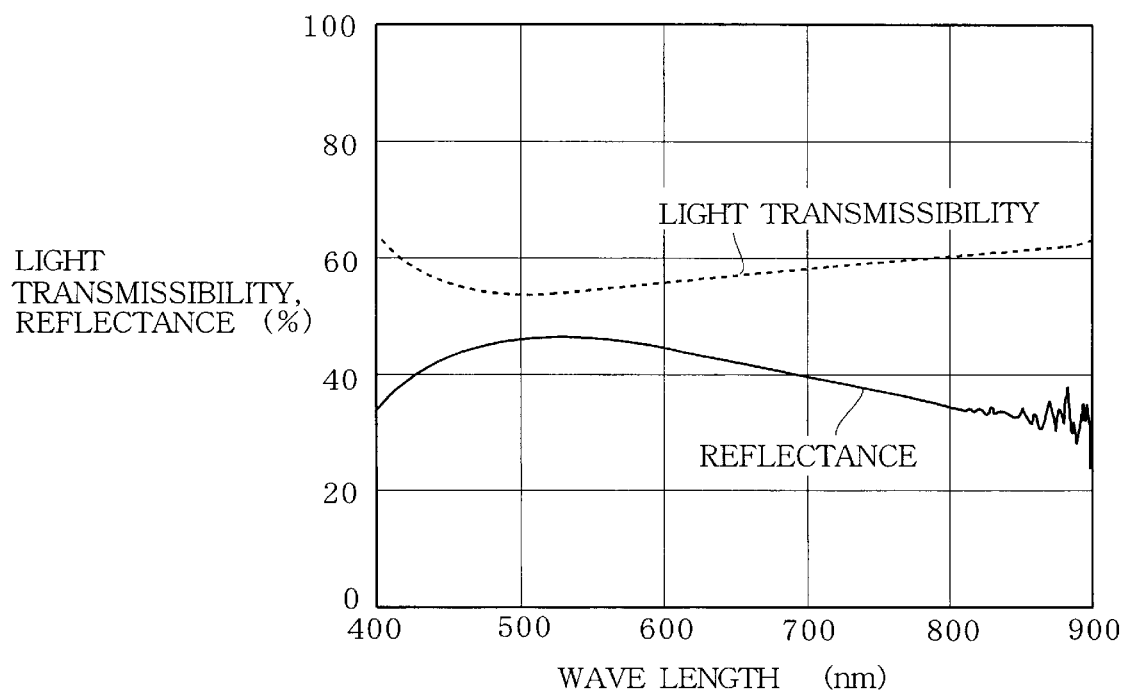
FIG. 2 is a graph indicating the optical properties of a first reflecting layer used in the two-disc laminated recording medium shown in FIG. 1.

The above measured results were indicated in FIG. 2. As shown in FIG. 2, a reflectance of the first reflecting layer 3 as a sample is about 40% when using a reproducing beam having a wave length of 800–400 nm. This means that it is possible to obtain reproduced signals in good condition regardless of what the wave length is. Thus, such reflecting layer is suitable for use in a two-disc laminated recording medium. If such improved reflecting layer is used as the first reflecting layer 3 in a conventional two-disc laminated recording medium, it is sure that such a conventional two-disc laminated recording medium may be used as a next generation optical recording medium capable of performing information recording and reproducing with the use of a blue laser beam.

Then, a O/Ti ratio and a noble gas element amount were measured by method called RBS with the use of an analysis device (3SDH-R10, NEC Corporation). In order to improve a measuring precision, a sample reflecting layer is set to have a thickness of about 240 nm and is formed on a silicon wafer. The thickness of the sample reflecting layer was measured using a measuring device (DektakIIA, SOLAN Corporation). As a result, it was found that the O/Ti ratio is; 2.05. It was also found that the titan oxide contains not only $TiO_2$, but also other compounds such as $Ti_nO_{2n-1}$, $Ti_2O_5$, $Ti_2O$, TiO. Among these compounds, it has been found that $TiO_2$ has an index of refraction of 2.4 or more, thus it becomes transparent upon being irradiated by a light beam which is a visible light.

According to the above measurement results, it was found that the first reflecting layer 3 has a composition very close to $TiO_2$, so that it has a large index of refraction and thus has a large reflectance and an excellent transparency.

Further, noble gas (Ar) element amount of the first reflecting layer 3 was 0.2 atom % which is a very small amount, so that there will not be any undesired crystallization.

Afterwards, the crystal state of the first reflecting layer 3 was measured in a method called X-ray diffraction with the use of an analysis device (MXP18, Mac Science Corporation). In the above test, the sample reflecting layer was formed on a glass substrate layer and its thickness was found to be 63 nm which is a value measured by an ellipsometer (ALP-2000, Shimazu Co., Ltd.), with the measurement results-shown in FIG. 3.

Figure 3:
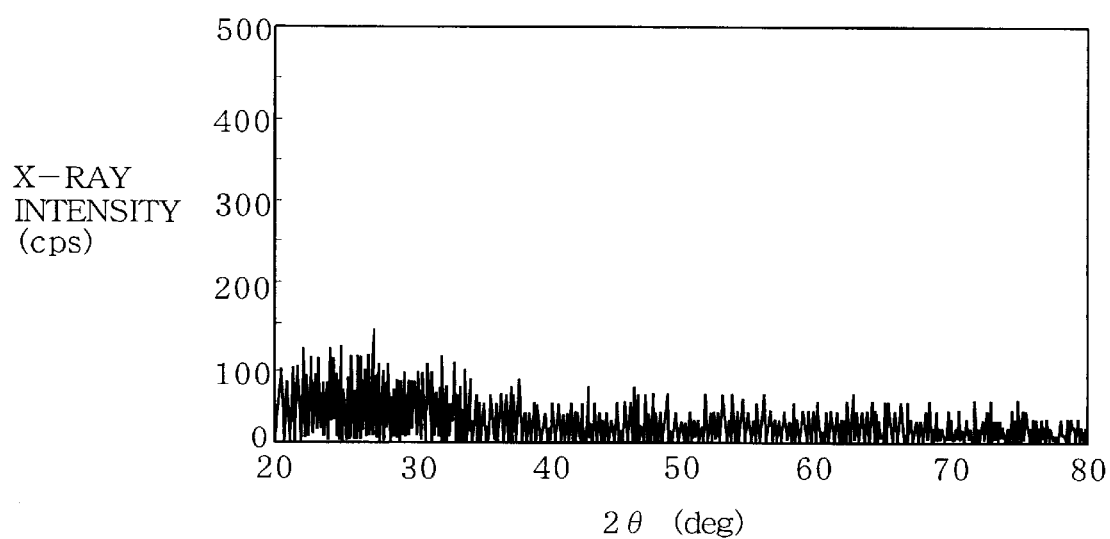
FIG. 3 is a graph indicating a relationship between a diffraction angle and an X-ray intensity when the X-ray is passing through the first reflecting layer shown in FIG. 1.

FIG. 3 is a graph whose horizontal axis is used to indicate 2θ representing a diffraction angle of an X-ray, vertical axis is used to indicate the intensity of a diffracted X-ray. It is understood from FIG. 3 that the intensity of a diffracted X-ray is extremely low without depending upon the angle 2θ and therefore no peak is recognized. This means that a regular crystal structure is not existing in the sample reflecting layer, and hence the first reflecting layer is a completely amorphous substance. Alternatively, although there might occur some aggregates of extremely small crystals, the sample reflecting layer as a whole should be considered to be in an amorphous state. In this way, since the first reflecting layer is substantially in an amorphous state, there would be no acolotropy in index of refraction (which is an inherent property of $TiO_2$); thus it is possible to prevent a reproduced signal from getting deteriorated.

In this way, according to the first embodiment of the present invention, the first reflecting layer 3 contains titan oxide as its main component, has a thickness of about 60 nm. Further, since the first reflecting layer 3 has been in an optimal state for use as a reflecting layer in a two-disc laminated recording medium without depending on the wavelength of a laser beam, a recording medium having such a first reflecting layer may be used as a next generation two-disc laminated recording medium capable of reproducing information with the use of a blue laser beam. Further, such an improved first reflecting layer may also be used in a conventional two-disc laminated recording medium (DVD) discussed above, and be used in another type of a two-disc laminated recording medium capable of information reproducing with the use of a green laser beam having a wave length of 500–600 nm.

Second Embodiment

Figure 4:
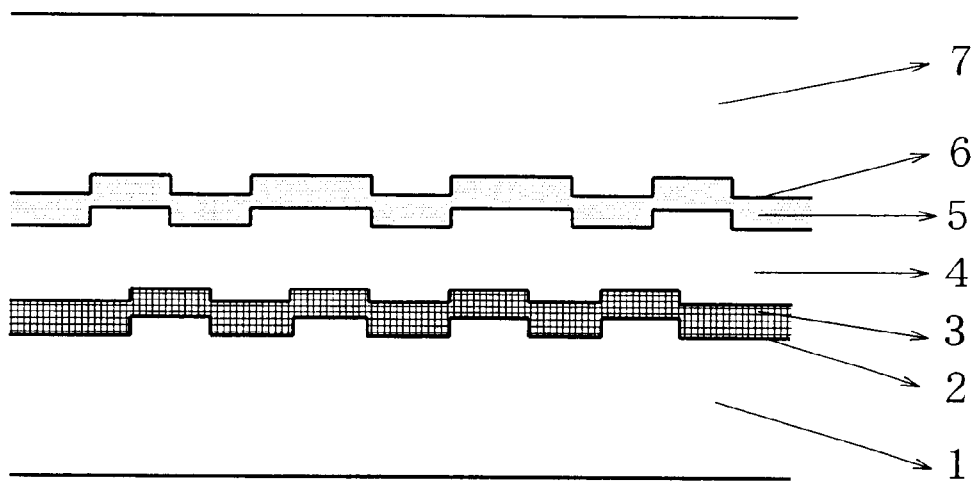
FIG. 4 is an enlarged cross sectional view indicating the structure of a two-disc laminated recording medium made according to a second embodiment of the present invention.

FIG. 4 is an enlarged cross sectional view showing the structure of a two-disc laminated recording medium made according to a second embodiment of the present invention. Similar to the first embodiment; the two-disc laminated recording medium of the second embodiment comprises a first substrate layer 1 formed of a light-transmissible material, a first recording surface 2 formed on the first substrate layer 1, a first reflecting layer 3 formed on the first recording surface 2, a second substrate layer 7, a second recording surface 6 formed on the surface of the second substrate layer 7, a second reflecting layer 5 formed on the second recording surface 6. With the use of a light-setting resin such as an acrylic ultraviolet-setting resin applied between the first reflecting layer 3 and the second reflecting layer 5, the first substrate layer 1 and the second substrate layer 7 are bonded together, in a manner such that the two recording surfaces are facing each other. In fact, such light-setting resin is formed into a spacer layer 4 upon its hardening.

The first reflecting layer 3 is made of a metal oxide such as titan oxide as its main component, and has a thickness of about 120 nm.

Next, in order to analyze the reflectance, the light transmissibility, the O/Ti ratio, the noble gas element amount, the crystal state of the first reflecting layer 3, a sample reflecting layer was prepared under an identical condition and in the same manner as those in the first embodiment.

Then, with the use of the same methods as those in the first embodiment, the optical properties (reflectance and light transmissibility) was measured.

In detail, the sample reflecting layer was formed on an acryl substrate layer and its thickness was found to be 125 nm which is a value measured by an ellipsometer (AEP-2000, Shimazu Co. Ltd.).

Figure 5:
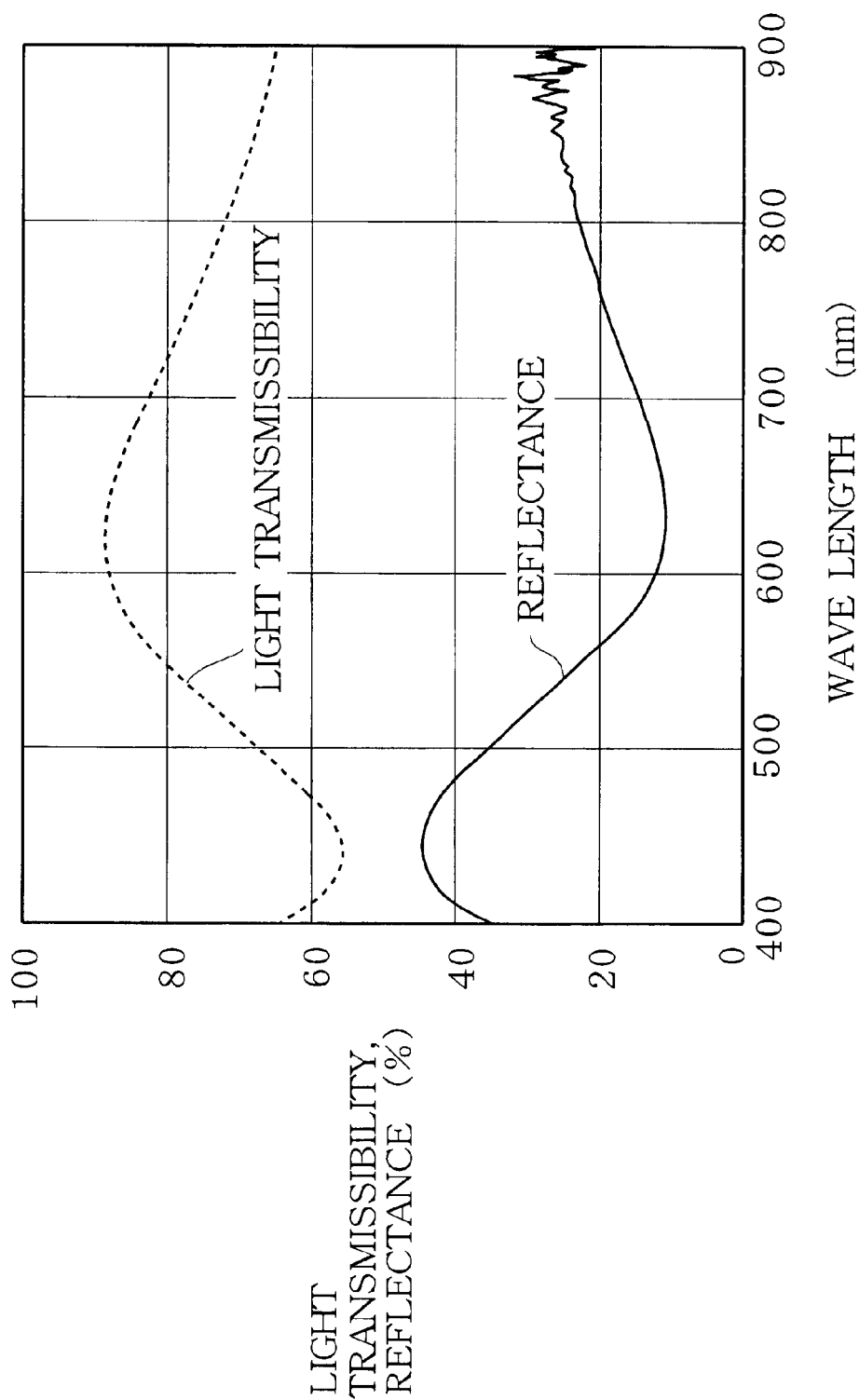
FIG. 5 is a graph indicating the optical properties of a first reflecting layer used in the two-disc laminated recording medium shown in FIG. 4.

The measured results were indicated in FIG. 5. As shown in FIG. 5, a reflectance of the sample reflecting layer is about 40% when using a reproducing beam having a wave length of about 430 nm. On the other hand, a reflectance of the sample reflecting layer is about 10% when using a reproducing beam having a wave length of about 600–650 nm. However, since a reflectance on the surface of the substrate layer will only be 8% if the wave length is 600–650, the above reflectance of 10% should be considered to have almost no any effect.

Accordingly, the two-disc laminated recording medium made according to the second embodiment of the present invent ion, will function as if it is only a single-disc recording medium if using a red laser beam having a wave length of 600–650 nm. In contrast, the two-disc laminated recording medium made according to the second embodiment of the present invention, will function fully as a two-disc laminated recording medium if using a blue laser beam having a wave length near 430 nm, due to a fact that the first reflecting layer has an adequate reflectance.

Then, the O/Ti ratio and the noble gas element amount were measured using the same methods and devices as those in the first embodiment. Namely, in order to ensure a measurement precision, a sample reflecting layer is set to have a thickness of about 380 nm and is formed on a silicon wafer. As a result, it was found that the O/Ti ratio is 1.87.

According to the above measurement results, it was found that the first reflecting layer 3 has a composition very close to $TiO_2$, so that it has a large index of refraction and thus has a large reflectance and an excellent transparency.

Further, noble gas (Ar) element amount of the first reflecting layer 3 was 2.5 atom %, a value which may be considered to be very small, thus there would be no undesired crystallization occurring in the reflecting layer.

Afterwards, the crystal state of the first reflecting layer 3 was measured in a method using the same apparatus as those in the the first embodiment. In this test, the sample reflecting layer was formed on a glass substrate layer and its thickness was found to be 63 nm which is a value measured by an ellipsometer (AEP-2000, Shimazu Co., Ltd.), with the measurement results shown in FIG. 6.

Figure 6:
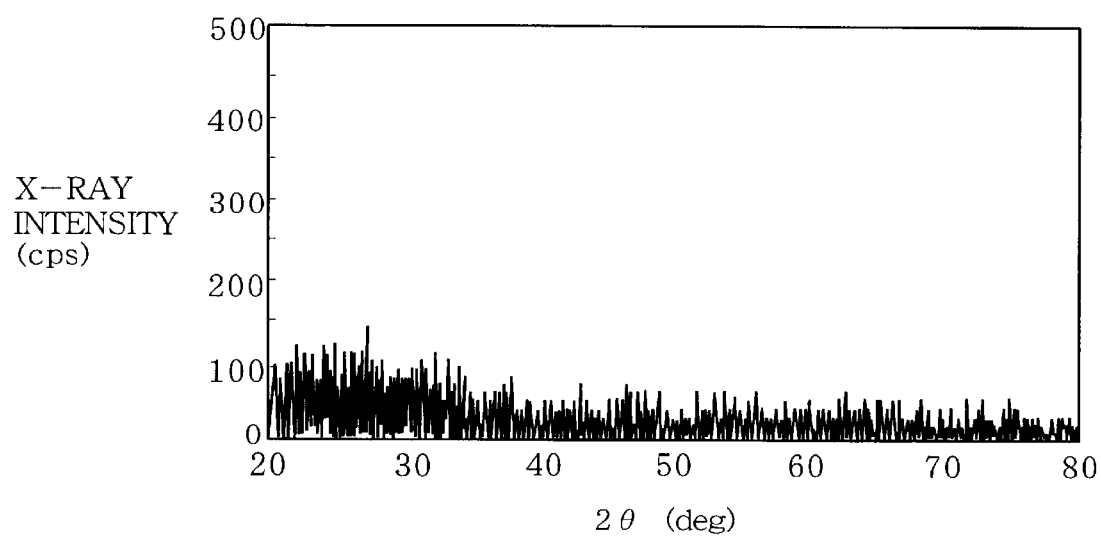
FIG. 6 is a graph indicating a relationship between a diffraction angle and an X-ray intensity when the X-ray is passing through the first reflecting layer shown in FIG. 4.

FIG. 6 is a graph in which the horizontal axis is used to indicate 2θ representing a diffraction angle of an X-ray, the vertical axis is used to indicate the intensity of a diffracted X-ray. It is understood from FIG. 6 that the intensity of a diffracted X-ray is extremely low without depending upon the angle 2θ and therefore no peak is recognized. This means that a regular crystal structure is not existing in the sample reflecting layer, and hence the first reflecting layer is a completely amorphous substance. Alternatively, although there might occur some aggregates of extremely small crystals, the sample reflecting layer as a whole should be considered to be in an amorphous state. In this way, since the first reflecting layer is substantially in an amorphous state, there would be no aeolotropy in index of refraction (which is an inherent property of $TiO_2$), thus it is possible to prevent a reproduced signal from getting deteriorated.

In this way, according to the second embodiment of the present invention, the first reflecting layer 3 contains titan oxide as its main component, has a thickness of about 120 nm. Further, the first reflecting layer 3 has been in an optimal state for use as a reflecting layer in a two-disc laminated recording medium, producing no reflection with respect to a red laser beam but having a good reflection with respect to a blue laser beam. Accordingly, for a conventional DVD using a red laser beam as a reproducing light source, a recording medium having such a first reflecting layer may function as a single-disc recording medium. On the other hand, for a next generation DVD using a blue red laser beam as a reproducing light source, a recording medium having such a first reflecting layer may function as a two-disc laminated recording medium.

Figure 7:
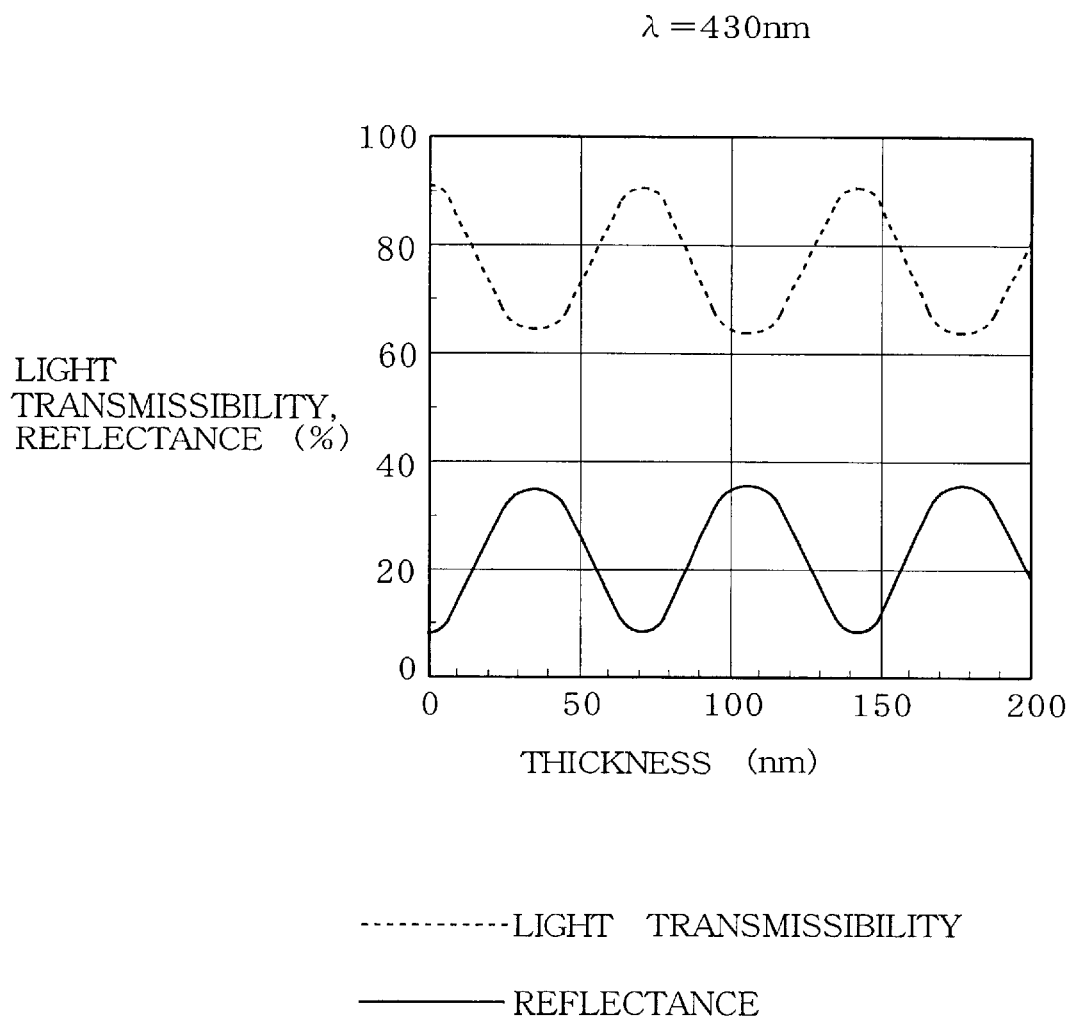
FIG. 7 is a graph indicating the optical properties of a first reflecting layer shown in FIG. 4, when using a laser beam having a wave length of 430 nm.
Figure 8:
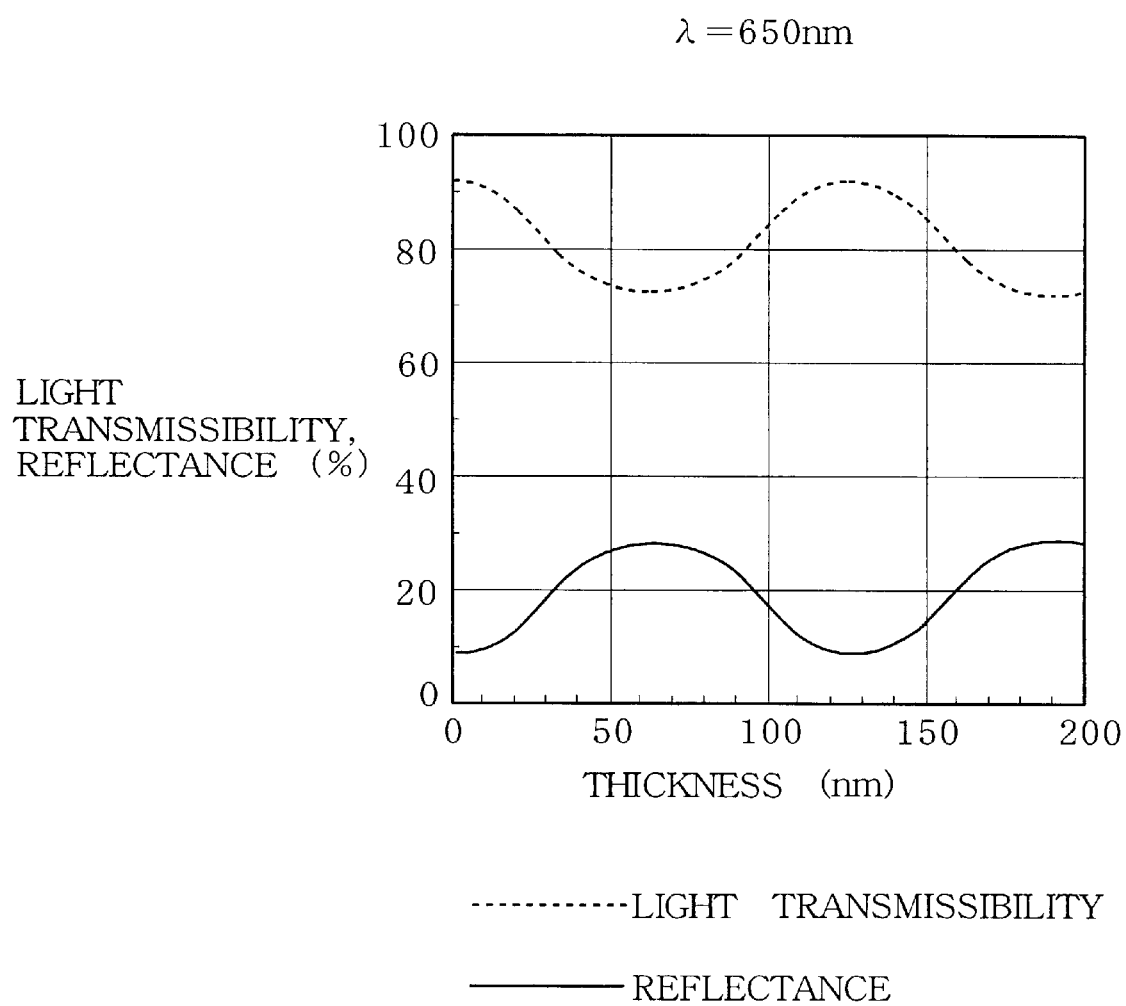
FIG. 8 is a graph indicating the optical properties of a first reflecting layer shown in FIG. 4, when using a laser beam having a wave length of 650 nm.

The index of refraction of the first reflecting layer containing titan oxide as its main component (made in the second embodiment) was measured using an ellipsometer (ES-VC, SOPRA), when using a laser beam having a wave length of 430 nm and another laser beam having a wave length of 650 nm. FIG. 7 and FIG. 8 are graphs each indicating a relationship between the thickness of the first reflecting layer a and the optical properties (reflectance and light transmissibility), which were calculated in accordance with an index of refraction $N_{430}$ for a laser beam having a wave length of 430 nm, and also in accordance with an index of refraction $N_{650}$ for a laser beam having a wave length of 650 nm, under a condition where the reflecting layer is sandwiched between two substrate layers made of a transparent acryl resin.

In practice, if the reflectance of the first reflecting layer 3 is substantially equal to a reflectance (8%) of a corresponding substrate layer, it is allowed to disregard the existence of the first reflecting layer 3. In other words, a two-disc laminated recording medium under such a condition may be deemed as a single-disc recording medium.

As is understood from FIG. 8, when using a laser beam having a wave length of 650 nm, a reflecting layer having a thickness of 100–150 nm will produce a reflectance of 16% or less, producing a result that the first reflecting layer 3 has a reflectance lower than that of a corresponding substrate layer, thereby rendering the recording medium to be used only as a single-disc recording medium.

On the other hand, as shown in FIG. 7, when using a laser beam having a wave length of 430 nm, a reflecting layer having a thickness of 100–110 will produce a reflectance having a maximum value. In this way, according to the second embodiment of the present invention, the first reflecting layer 3 can be so designed that it does not produce a reflection when using a red laser beam having a wave length of 650 nm, but is sure to produce a sufficient reflection when using a blue laser beam having a wave length of 430 nm, so that it can be effectively used as a reflecting layer in a two-disc laminated recording medium.

When using a laser beam having a wave length of 650 nm, the first reflecting layer 3 is allowed to be disregarded, but the thickness of the first reflecting layer 3 should be set to be at most 150 nm. If the thickness is larger than 150 nm, there will be a deterioration in the quality of a reproduced signal.

On the other hand, if the thickness of the first reflecting layer 3 is 150 nm, a wave length of a laser beam for obtaining a desired function as a two-disc laminated recording medium should not be only 430 nm, but be selected to be longer or shorter. As may be understood in FIG. 7, if the first reflecting layer 3 has a thickness of 150 nm, there will be only an extremely low reflectance even if the laser beam has a wave length of 430 nm, hence rendering it impossible for the recording medium to function as a two-disc laminated recording medium.

Further, as shown in FIG. 7, when a laser beam has a relatively short wave length (such as 430 nm) a maximum reflectance will repeatedly occur with a short period. On the other hand, as shown in FIG. 8, if a laser beam has a relatively long wave length (such as 650 nm), a maximum reflectance will repeatedly occur with a long period.

Third Embodiment

Figure 9:
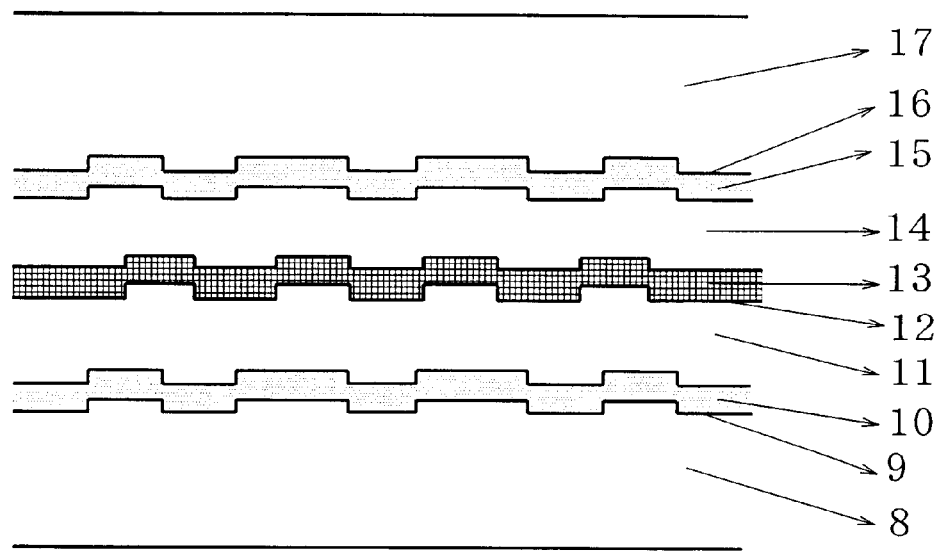
FIG. 9 is an enlarged cross sectional view indicating the structure of a three-disc laminated recording medium made according to a third embodiment of the present invention.

FIG. 9 is an enlarged cross sectional view showing the structure of a three-disc laminated recording medium made according to a third embodiment of the present invention.

As shown in FIG. 9, the three-disc laminated recording medium comprises a first substrate layer 8 formed of a light-transmissible material, a first recording surface 9 formed on the first substrate layer 8, a first reflecting layer 10 formed on the first recording surface 9, a transfer layer 11, a second recording surface 12 formed on the transfer layer 11, a second reflecting layer 13 formed on the second recording surface 12, a second substrate layer 17, a third recording surface 16 formed on the second substrate layer 17, a third reflecting layer 15 formed in contact with the third recording surface 16, a spacer layer 14 formed between the second reflecting layer 13 and the third reflecting layer 15. Here, both the transfer layer 11 and the spacer layer 14 are formed of a light-setting resin.

Each of the first substrate layer 8, the transfer layer 11 and the second substrate layer 17 has formed on one surface thereof a plurality of information pits possible to be read by a reproducing laser beam, thereby forming the first recording surface 9, the second recording surface 12, and third recording surface 16. A plurality of spiral-like tracks are formed on each of the first, second and third recording surfaces 9, 12, 16 so that the above pits are arranged in and along said tracks.

Each of the first and second substrate layers 8 and 17 is formed of a transparent resin such as polycarbonate resin through an inject ion molding process, and has a thickness of about 0.6 mm. In detail these information pits are formed during said injection molding process with the use of a metal mould made of nickel (Ni) which is called a stamper.

The transfer layer 11 is formed of a light-setting resin such as an acrylic ultraviolet-setting resin, having a thickness of about 40 micron. The information pits of the second recording surface 12 are formed by dropping an amount of liquid ultraviolet-setting resin on to a metal mold made of nickel (here, such metal mold is called as a stamper). Then, the first substrate layer 8, on which the first reflecting layer 10 has been formed, is rendered to cover up the information pits forming the second recording surface 12, followed by irradiation with an ultraviolet light so as to solidify the liquid ultraviolet-setting resin.

The spacer layer 14 is formed in the same manner as that for forming the transfer layer 11 and has a thickness of about 40 micron. In detail, the spacer layer 14 is formed by a light-setting resin located between the second reflecting layer 13 and the third reflecting layer 15. Here, the third reflecting layer 15 is made of a metal containing aluminium as its main component, and has a thickness of about 50 nm.

In fact, the properties of the second reflecting layer 13 are just the same as those of the first reflecting layer 3 in the first and second embodiments.

However, with such a multi-disc laminated recording medium, since it is required that a light amount arriving at an optical pickup be made substantially uniform at any time, the first reflecting layer 10 should be designed such that a light amount reflected from the second reflecting layer 13 and passing through the first reflecting layer 10 and another light amount reflected from the third reflecting layer 15 and passing through the first reflecting layer 10 and the second reflecting layer 13 will be substantially the same as a light amount reflected from the first reflecting layer 10.

Figure 10:
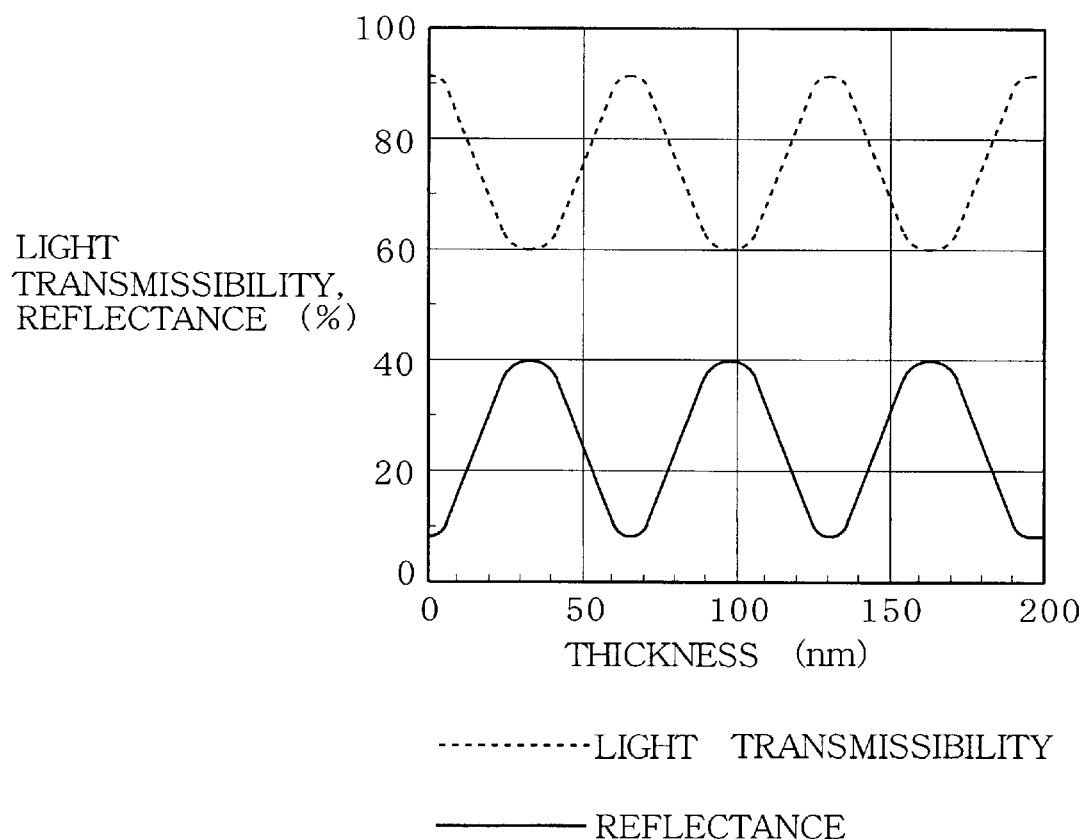
FIG. 10 is a graph indicating the optical properties of a first or second reflecting layer used in the three-disc laminated recording medium shown in FIG. 9.
Figure 12:
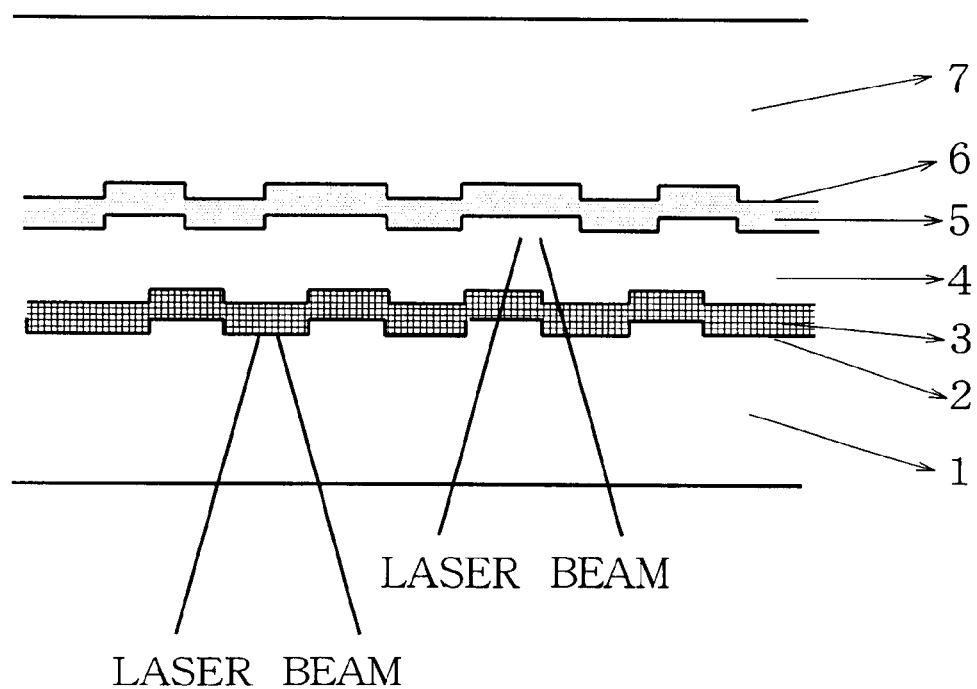
FIG. 12 is an enlarged cross sectional view indicating the structure of a two-disc laminated recording medium made according to a prior art.

The index of refraction ($N_{400}$) of the first reflecting layer containing titan oxide as its main component (made in the first embodiment) was measured using an ellipsometer (ES-VG, SOPRA Corporation), with a laser beam having a wave length of 400 nm. FIG. 10 is a graph indicating a relationship between the thickness of the first reflecting layer and the optical properties (reflectance and light transmissibility), which were calculated in accordance with an index of refraction $N_{400}$ when using a laser beam having a wave length of 400 nm, under a condition where the reflecting layer is sandwiched between two substrate layers made of a transparent acryl resin.

Here, since the third reflecting layer 15 is made of a metal containing aluminium as its main component, the reflectance of the reflecting layer 15 is about 80%. The reflectance of the second reflecting layer 13 should be about 34%, and its light transmissibility should be about 66%.

However, since there is an effect of substrate surface reflection, the thickness of the third reflecting layer 15 may be selected such that its the reflectance is 39% and its light transmissibility is 61%. In such a case, the thickness of the second reflecting layer 13 may be 27–38 nm.

On the other hand, the reflectance of the first reflecting layer 10 should be about 21%, and its light transmissibility should be about 79%. However, since there is an effect of substrate surface reflection, the thickness of the first reflecting layer 10 should be selected such that its the reflectance is 27% and its light transmissibility is 73%. In such a case, the thickness of the first reflecting layer 10 may be 16 nm.

In fact, a reflecting layer of a recording medium is preferred to have as small thickness as possible in view of a manufacturing cost. Further, since a reflecting layer having a large thickness will cause a deterioration in the quality of a reproduced signal (due to an effect of light interference), it is also preferred to select a reflecting layer having a thickness as small as possible, provided that a desired reflectance and a desired light transmissibility may be obtained.

In this way, with the use of the third embodiment of the present invention, since each of the first reflecting layer 10 and the second reflecting layer 13 contains titan oxide as its main component, a recording medium containing such reflecting layers and arranged in the manner as shown in FIG. 9 may be used as a next generation multi-disc laminated recording medium capable of information reproducing with the use of a blue laser beam having a wave length of 400 nm.

In fact, if two three-disc laminated recording media (as shown in FIG. 9) are bonded together, it is allowed to produce a six-disc laminated recording medium.

FIG. 11 is a table showing the measurement results of several reflecting layers of the present invention, each of which is formed on a well-polished silicon wafer and was measured with the use of a method called RBS employing an analysis device (3SDH-R10, NEC Corporation). As can be seen from FIG. 11, O/Ti ratio is control led within a range 1.8–2.2 in order to minimize a possible measurement error, Ar concentration is controlled below 3 atom %. It has been proved by the inventor's experiments that a reflecting layer having the above composition is quite suitable for use in a two-disc laminated recording medium.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. An optical recording medium, comprising at least:
   a first information recording surface formed in advance with a plurality of information pits;
   a first reflecting layer formed on the first information recording surface;
   a second information recording surface formed in advance with a plurality of information pits; and
   a second reflecting layer formed on the second information recording surface,
   wherein the first reflecting layer contains a titan oxide as a main component;
   wherein the first reflecting layer in its entirety is in an amorphous state or consists of an aggregate of fine crystals.

2. The optical recording medium according to claim 1, wherein the titan oxide contained in the first reflecting layer has an O/Ti ratio of 1.8–2.2.

3. The optical recording medium according to claim 1, wherein the first reflecting layer contains a noble gas element with a concentration of 3 atom % or less.

4. The optical recording medium according to claim 1, wherein the first reflecting layer has a thickness of 150 nm or less.

5. The optical recording medium according to claim 1, wherein the second reflecting layer is made of a metal containing an aluminium as a main component.

6. The optical recording medium of claim 1, wherein the information pits are formed during an injection molding process.

7. An optical recording medium, comprising at least:
  a first information recording surface formed in advance with a plurality of information pits;
  a first reflecting layer formed on the first information recording surface;
  a second information recording surface formed in advance with a plurality of information pits;
  a second reflecting layer formed on the second information recording surface;
  a third information recording surface formed in advance with a plurality of information pits; and
  a third reflecting layer formed on the third information recording surface,
  wherein each of the first and second reflecting layers contains a titan oxide as a main component;
  wherein each of the first and second reflecting layers in its entirety is in an amorphous state or consists of an aggregate of fine crystals.

8. The optical recording medium according to claim 7, wherein the titan oxide contained in each of the first and second reflecting layers has an O/Ti ratio of 1.8–2.2.

9. The optical recording medium according to claim 7, wherein each of the first and second reflecting layers contains a noble gas element with a concentration of 3 atom % or less.

10. The optical recording medium according to claim 7, wherein each of the first and second reflecting layers has a thickness of 150 nm or less.

11. The optical recording medium according to claim 7, wherein the third reflecting layer is made of a metal containing an aluminium as a main component.

12. The optical recording medium of claim 7, wherein the information pits are formed during an injection molding process.

* * * * *

UNITED STATES PATENT AND TRADEMARK OFFICE
CERTIFICATE OF CORRECTION

PATENT NO.     : 6,385,163 B1
DATED          : May 7, 2002
INVENTOR(S)    : Takanobu Higuchi et al.

It is certified that error appears in the above-identified patent and that said Letters Patent is hereby corrected as shown below:

<u>Title page,</u>
Item [73], correct the assignee information as follows:
"[73]  Assignee: Pioneer Electric Corporation, Tokyo (JP)" to
-- [73]  Assignee: Pioneer Electronic Corporation, Tokyo (JP) --

Signed and Sealed this

Eighth Day of October, 2002

*Attest:*

*Attesting Officer*

JAMES E. ROGAN
*Director of the United States Patent and Trademark Office*